US008966287B2

(12) United States Patent
Bogorad

(10) Patent No.: US 8,966,287 B2
(45) Date of Patent: Feb. 24, 2015

(54) SYSTEMS AND METHODS FOR SECURE THIRD-PARTY DATA STORAGE

(71) Applicant: Symantec Corporation, Mountain View, CA (US)

(72) Inventor: Walter Bogorad, Danville, CA (US)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 13/800,305

(22) Filed: Mar. 13, 2013

(65) Prior Publication Data

US 2013/0254537 A1    Sep. 26, 2013

Related U.S. Application Data

(63) Continuation-in-part of application No. 13/430,607, filed on Mar. 26, 2012, now Pat. No. 8,458,494.

(51) Int. Cl.
| | | |
|---|---|---|
| *H04L 9/30* | (2006.01) | |
| *H04L 9/14* | (2006.01) | |
| *G06F 21/60* | (2013.01) | |
| *H04L 9/08* | (2006.01) | |
| *H04L 29/06* | (2006.01) | |

(52) U.S. Cl.
CPC ............ *G06F 21/602* (2013.01); *H04L 9/0822* (2013.01); *H04L 9/14* (2013.01); *H04L 63/10* (2013.01); *H04L 63/06* (2013.01); *H04L 9/0894* (2013.01)
USPC ............................ 713/193; 380/282; 380/285

(58) Field of Classification Search
None
See application file for complete search history.

(56) References Cited

U.S. PATENT DOCUMENTS

| | | | |
|---|---|---|---|
| 6,947,556 B1 | 9/2005 | Matyas, Jr. et al. | |
| 6,983,367 B2 * | 1/2006 | Go et al. | 713/168 |
| 6,990,580 B2 * | 1/2006 | Go et al. | 713/168 |
| 7,117,362 B2 * | 10/2006 | Go et al. | 713/168 |
| 7,124,297 B2 * | 10/2006 | Go et al. | 713/168 |
| 7,215,779 B2 * | 5/2007 | Go et al. | 380/277 |
| 7,240,033 B2 * | 7/2007 | Kuriya et al. | 705/51 |
| 7,487,219 B1 | 2/2009 | Jia et al. | |
| 7,505,978 B2 | 3/2009 | Bodin et al. | |
| 7,949,681 B2 | 5/2011 | Bodin et al. | |

(Continued)

FOREIGN PATENT DOCUMENTS

EP    2336886    6/2011

OTHER PUBLICATIONS

Martin Mulazzani et al.; Dark Clouds on the Horizon: Using Cloud Storage as Attack Vector and Online Slack Space; SBA Research; Sep. 18, 2011.

(Continued)

*Primary Examiner* — Christopher Revak
(74) *Attorney, Agent, or Firm* — ALG Intellectual Property, LLC

(57) ABSTRACT

A computer-implemented method for secure third-party data storage may include 1) identifying, at a server-side computing device, a request from a client system to access an encrypted file stored under a user account, 2) identifying, in response to the request, an asymmetric key pair designated for the user account that includes an encryption key and a decryption key that has been encrypted with a client-side key, 3) receiving, from the client system, the client-side key, 4) decrypting the decryption key with the client-side key, and 5) using the decryption key to access an unencrypted version of the encrypted file. Various other methods, systems, and computer-readable media are also disclosed.

20 Claims, 13 Drawing Sheets

(56) References Cited

U.S. PATENT DOCUMENTS

| | | | |
|---|---|---|---|
| 8,090,102 B2 | 1/2012 | Kitaya et al. | |
| 8,458,494 B1* | 6/2013 | Bogorad | 713/193 |
| 8,745,416 B2* | 6/2014 | Bogorad | 713/193 |
| 2001/0029581 A1 | 10/2001 | Knauft | |
| 2003/0163705 A1 | 8/2003 | Richards, Jr. et al. | |
| 2003/0174841 A1 | 9/2003 | Nault et al. | |
| 2005/0157880 A1 | 7/2005 | Kurn et al. | |
| 2006/0190740 A1* | 8/2006 | Hori et al. | 713/189 |
| 2009/0129588 A1* | 5/2009 | Takakusu et al. | 380/42 |
| 2010/0172504 A1 | 7/2010 | Allen et al. | |
| 2010/0217987 A1 | 8/2010 | Shevade | |
| 2010/0257351 A1 | 10/2010 | O'Connor et al. | |
| 2010/0306176 A1 | 12/2010 | Johnson et al. | |
| 2011/0022850 A1* | 1/2011 | Lee et al. | 713/189 |
| 2011/0258333 A1 | 10/2011 | Pomerantz et al. | |
| 2012/0328105 A1 | 12/2012 | Mukkara et al. | |
| 2013/0111217 A1 | 5/2013 | Kopasz et al. | |
| 2014/0215210 A1* | 7/2014 | Wang et al. | 713/165 |

OTHER PUBLICATIONS

Amazon; Amazon Simple Storage Service (Amazon S3); Jul. 2006; http://aws.amazon.com/s3/, as accessed Mar. 2, 2012.

Box.Net, Inc.; Comprehensive security at all levels; Mar. 2009, http://www.box.net/static/download/Security_Overview_2-1.pdf, as accessed Mar. 2, 2012.

Sarah Perez; Finally! Bitcasa CEO Explains How the Encryptions Works; Sep. 18, 2011; http://techcrunch.com/2011/09/18/bitcasa-explains-encryption/, as accessed Mar. 2, 2012.

Mark Storer et al.; Secure Data Deduplication; StorageSS' '08; Oct. 31, 2008; Fairfax, VA, USA.

International Search Report and Written Opinion of the International Searching Authority from related International Application No. PCT/US2013/028224; Jun. 3, 2013.

Symantec Corporation; Systems and Methods for Secure Third-Party Data Storage; International Application No. PCT/US2013/028224, Filed Feb. 28, 2013.

Paul Agbabian; Systems and Methods for Providing Access to Data Accounts Within User Profiles Via Cloud-Based Storage Services; U.S. Appl. No. 13/742,217, filed Jan. 15, 2013.

Walter Bogorad; Systems and Methods for Secure Third-Party Data Storage; U.S. Appl. No. 13/787,757, filed Mar. 6, 2013.

Trimbak Bardale; Systems and Methods for Securely Deduplicating Data Owned by Multiple Entities; U.S. Appl. No. 12/874,640, filed Sep. 2, 2012.

Yu, Shucheng et al., "Achieving Secure, Scalable, and Fine-grained Data Access Control in Cloud Computing", Infocom, 2010 Proceedings IEEE, IEEE, Piscataway, NJ, USA, (Mar. 14, 2010).

Tsai, Wei-Tek et al., "Role-Based Access-Control Using Reference Ontology in Clouds", Autonomous Decetralized Systems (ISADS), 2011 10th International Symposium on, IEEE, (Mar. 23, 2011).

"Private Cloud for Your Enterprise—Installable Cloud Storage Solution for Security & Control", http://www.gladinet.com/CloudEnterprise/, as accessed Apr. 16, 2014, Gladinet, Inc., (2008).

"Syncplicity by EMC", http://www.syncplicity.com/solutions/, as accessed Apr. 16, 2014, Syncplicity LLC, (2007).

"Hybrid Deployment Architecture", http://www.ctera.com/products/technology/hybrid-deployment-architecture, as accessed Apr. 16, 2014, CTERA Networks Ltd., (Oct. 19, 2012).

Banerji, Preeta et al., "Deploying an Enterprise-Ready Content Sync-and-Share Solution", http://www.intel.com/content/dam/www/public/us/en/documents/white-papers/deploying-an-enterprise-ready-content-sync-and-share-solution.pdf, as accessed Apr. 16, 2014, IT@Intel White Paper, Intel Corporation, (Sep. 2013).

"Newest ownCloud Enterprise File Sync and Share Keeps IT in Control of Corporate Data", https://owncloud.com/blog/newest-owncloud-enterprise-file-sync-share-keeps-control-corporate-data, as accessed Apr. 16, 2014, ownCloud Inc., Lexington, MA, (Mar. 11, 2014).

"kiteworks for Enterprise IT—Cloud Deployment Options", http://www.accellion.com/solutions/enterprise-it-and-security/cloud-deployment-options, as accessed Apr. 16, 2014, Accellion, (Oct. 1, 2013).

Walter Bogorad; Systems and Methods for Secure Hybrid Third-Party Data Storage; U.S. Appl. No. 14/271,967, filed May 7, 2014.

Symantec Corporation; Systems and Methods for Secure Third-Party Data Storage; International Application No. PCT/US13/28224, Filed Feb. 28, 2013.

* cited by examiner

SYSTEMS AND METHODS FOR SECURE THIRD-PARTY DATA STORAGE

CROSS REFERENCE TO RELATED APPLICATION

This application is a continuation-in-part of U.S. application Ser. No. 13/430,607, filed 26 Mar. 2012, which is now U.S. Pat. No. 8,458,494, the disclosure of which is incorporated, in its entirety, by this reference.

BACKGROUND

Organizations and consumers increasingly use third-party services to store data. Third-party storage services may provide a number of benefits to customers, including flexibility, low capitalization requirements, add-on services, data sharing, and centralized access to data.

Many third-party storage customers want or need to encrypt their data before submitting the same to a third-party storage vendor. For example, individual consumers may wish to encrypt data sent to third-party storage vendors due to privacy concerns. Similarly, organizations may wish to encrypt data sent to third-party storage vendors in order to ensure compliance with internal or external data-protection requirements, such as governmental laws and regulations, partnership agreements with other organizations, etc. Unfortunately, by encrypting data before submitting the same to a third-party storage system, customers may interfere with a third-party storage vendor's attempt to deduplicate the data. For example, if two customers encrypt identical files using different encryption schemes (e.g., different keys), the resulting encrypted files will differ, potentially preventing the third-party storage vendor from deduplicating the files into a single file that is referenced multiple times. Additionally, encrypting files before submitting the files to a third-party storage system may interfere with the ability of a third-party storage service to efficiently share the files with other users where directed and/or to perform other services on the files, such as running security scans on the files, generating custom views of the files, etc.

In view of the above limitations, the instant disclosure identifies a need for additional and improved systems and methods for secure third-party data storage.

SUMMARY

The instant disclosure generally relates to systems and methods for secure third-party data storage. As will be described in greater detail below, by maintaining asymmetric key pairs for encrypting and decrypting secured data (e.g., files and/or encryption keys for files) on a third-party storage server and encrypting the decryption keys of these asymmetric key pairs with encryption keys maintained by clients, the systems and methods described herein may allow the third-party storage server to encrypt data as needed but require clients to submit a decryption key in order to access secured data.

In one embodiment, a computer-implemented method for secure third-party data storage may include 1) identifying, at a server-side computing device, a request from a client system to access an encrypted file stored under a user account (where the requested access requires decryption of the encrypted file), 2) identifying, in response to the request, an asymmetric key pair designated for the user account that includes an encryption key and a decryption key that has been encrypted with a client-side key, 3) receiving, from the client system, the client-side key, 4) decrypting the decryption key with the client-side key, and 5) using the decryption key to access an unencrypted version of the encrypted file.

In some examples, receiving the client-side key may include storing the client-side key in volatile memory without storing the client-side key in non-volatile memory. Using the decryption key to access the unencrypted version of the encrypted file may include any of a variety of steps. In some embodiments, using the decryption key to access the unencrypted version of the encrypted file may include 1) identifying a file key (which has been encrypted with the encryption key) used to encrypt the encrypted file, 2) decrypting the file key with the decryption key, and 3) decrypting the encrypted file with the file key.

In some examples, using the decryption key to access the unencrypted version of the encrypted file may include generating metadata describing the unencrypted version of the encrypted file. In these examples, generating the metadata may include 1) performing a security scan of the unencrypted version of the encrypted file, 2) indexing the unencrypted version of the encrypted file based on content within the unencrypted version of the encrypted file, and/or 3) generating a preview of the unencrypted version of the encrypted file.

In some embodiments, using the decryption key to access the unencrypted version of the encrypted file may include 1) identifying an additional asymmetric key pair designated for a plurality of user accounts including the user account, where the additional asymmetric key pair includes an additional encryption key and an additional decryption key that has been encrypted with the encryption key (e.g., of the asymmetric key pair designated for the user account), 2) decrypting the additional decryption key with the decryption key (e.g., of the asymmetric key pair designated for the user account), 3) identifying a file key (which has been encrypted with the additional encryption key) used to encrypt the encrypted file, 4) decrypting the file key with the additional decryption key, and 5) decrypting the encrypted file with the file key.

In some examples, accessing the unencrypted version of the encrypted file may include transmitting the unencrypted version of the encrypted file to the client system. Additionally or alternatively, accessing the unencrypted version of the encrypted file may include providing access to the unencrypted version of the encrypted file to an additional user account, where 1) an additional asymmetric key pair is designated for the additional user account, 2) the additional asymmetric key pair includes an additional encryption key and an additional decryption key, and 3) the additional decryption key is encrypted with an additional client-side key. In these embodiments, providing access to the unencrypted version of the encrypted file to the additional user account may include 1) identifying a file key (which has been encrypted with the encryption key) used to encrypt the encrypted file, 2) decrypting the file key with the decryption key, and 3) encrypting a copy of the file key with the additional encryption key.

In some examples, the computer-implemented method may also include 1) identifying an additional user account designated to access the unencrypted version of the encrypted file, where a) an additional asymmetric key pair is designated for the additional user account, b) the additional asymmetric key pair includes an additional encryption key and an additional decryption key, and c) the additional decryption key is encrypted with an additional client-side key, and 2) encrypting the decryption key with the additional encryption key. In these examples, the computer-implemented method may additionally include 1) identifying an additional request from an additional client system to further access the encrypted file via the additional user account (where the additional requested access requires decryption of the encrypted file), 2) decrypting the decryption key with the additional decryption key, and 3) using the decryption key to access the unencrypted version of the encrypted file via the additional user account.

In one example, the computer-implemented method may also include 1) receiving the unencrypted version of the encrypted file from the client system, 2) generating the encrypted file by a) generating a file key based on at least one characteristic of the unencrypted version of the encrypted file and b) encrypting the unencrypted version of the encrypted file with the file key, and 3) encrypting the file key with the encryption key. In this example, the computer-implemented method may additionally include deduplicating the encrypted file with an additional encrypted file that is encrypted with the file key.

In one embodiment, a system for implementing the above-described method may include 1) an identification module programmed to identify, at the server-side computing device, a request from a client system to access an encrypted file stored under a user account (where the requested access requires decryption of the encrypted file), 2) a key module programmed to identify, in response to the request, an asymmetric key pair designated for the user account that includes an encryption key and a decryption key that has been encrypted with a client-side key, 3) a receiving module programmed to receive, from the client system, the client-side key, 4) a decryption module programmed to decrypt the decryption key with the client-side key, and 5) an access module programmed to use the decryption key to access an unencrypted version of the encrypted file. The system may also include at least one processor configured to execute the identification module, the key module, the receiving module, the decryption module, and the access module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify, at a server-side computing device, a request from a client system to access an encrypted file stored under a user account (where the requested access requires decryption of the encrypted file), 2) identify, in response to the request, an asymmetric key pair designated for the user account that includes an encryption key and a decryption key that has been encrypted with a client-side key, 3) receive, from the client system, the client-side key, 4) decrypt the decryption key with the client-side key, and 5) use the decryption key to access an unencrypted version of the encrypted file.

As will be explained in greater detail below, by maintaining asymmetric key pairs for encrypting and decrypting secured data on a third-party storage server and encrypting the decryption keys of the asymmetric key pairs with encryption keys maintained by clients, the systems and methods described herein may securely store and encrypt client data without storing the client-side decryption keys required to access the secured data in an unencrypted state. These systems and methods may thereby prevent an attacker who has gained access to a third-party storage system from accessing the secured data in an unencrypted state, while still allowing and/or facilitating the sharing, deduplication, analysis, and/or indexing of this secured data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
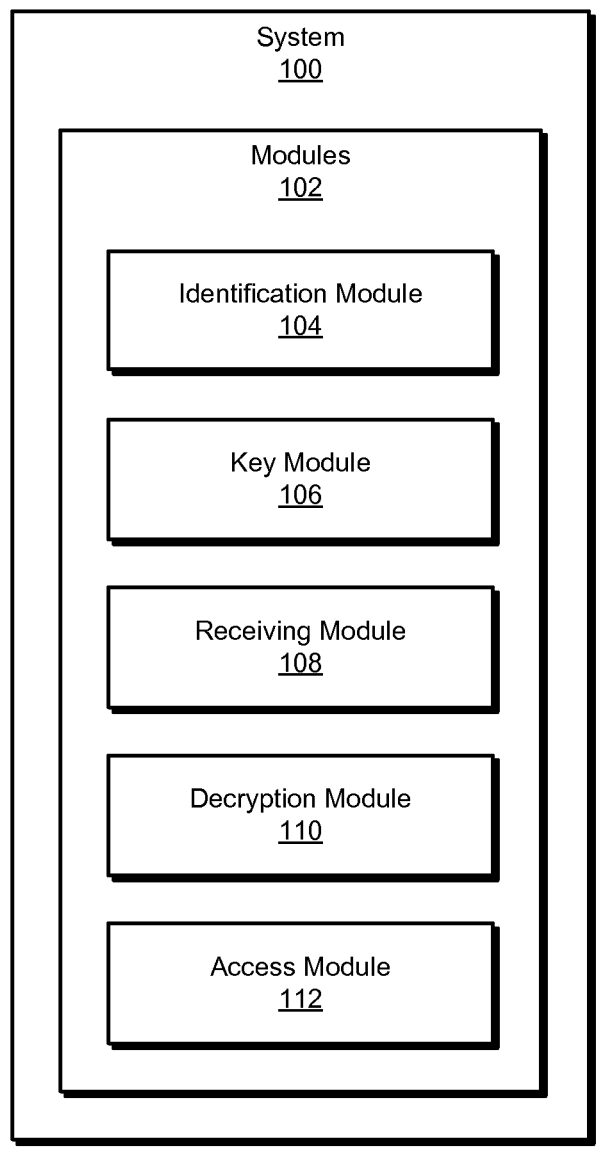
FIG. 1 is a block diagram of an exemplary system for secure third-party data storage.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The following will provide, with reference to FIGS. 1-2, 4-7, 10-11, and 13, detailed descriptions of exemplary systems for secure third-party data storage. Detailed descriptions of corresponding computer-implemented methods will also be provided in connection with FIGS. 3 and 12. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for secure third-party data storage. As illustrated in this figure, exemplary system 100 may include one or more modules 102 for performing one or more tasks. For example, and as will be explained in greater detail below, exemplary system 100 may include an identification module 104 programmed to identify, at the server-side computing device, a request from a client system to access an encrypted file stored under a user account. Exemplary system 100 may also include a key module 106 programmed to identify, in response to the request, an asymmetric key pair designated for the user account that includes an encryption key and a decryption key that has been encrypted with a client-side key.

In addition, and as will be described in greater detail below, exemplary system 100 may include a receiving module 108 programmed to receive the client-side key from the client system. Exemplary system 100 may also include a decryption module 110 programmed to decrypt the decryption key with the client-side key. Exemplary system 100 may additionally include an access module 112 programmed to use the decryption key to access an unencrypted version of the encrypted file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client system 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

Figure 2:
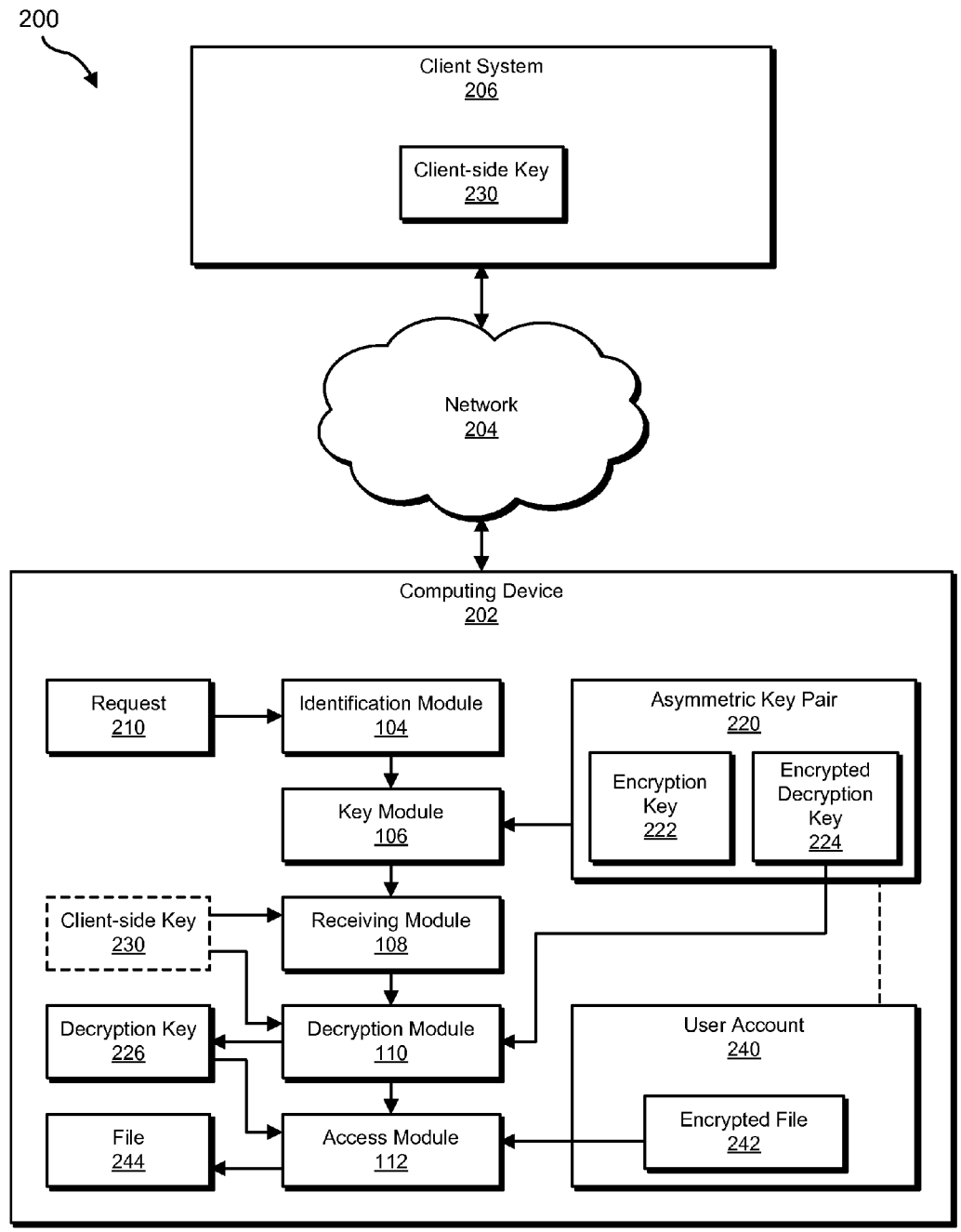
FIG. 2 is a block diagram of an exemplary system for secure third-party data storage.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 (to provide, e.g., third-party storage services to client system 206) via a network 204.

In one embodiment, one or more of modules 102 from FIG. 1 may, when executed by at least one processor of computing device 202, facilitate computing device 202 in secure third-party data storage. For example, and as will be described in greater detail below, one or more of modules 102 may cause computing device 202 to 1) identify, at a server-side computing device 202, a request 210 from a client system 206 to access an encrypted file 242 stored under a user account 240, 2) identify, in response to request 210, an asymmetric key pair 220 designated for user account 240 that includes an encryption key 222 and an encrypted decryption key 224 that has been encrypted with a client-side key 230, 3) receive client-side key 230 from client system 206, 4) decrypt encrypted decryption key 224 with client-side key 230 (resulting, e.g., in a decryption key 226), and 5) use decryption key 226 to access an unencrypted version of encrypted file 242 (e.g., a file 244).

Computing device 202 and client system 206 generally represent any type or form of computing device capable of reading computer-executable instructions. Examples of computing device 202 and client system 206 include, without limitation, servers, desktops, laptops, tablets, cellular phones, personal digital assistants (PDAs), multimedia players, embedded systems, combinations of one or more of the same, exemplary computing system 810 in FIG. 8, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 900 in FIG. 9, or the like. Network 204 may facilitate communication or data transfer using wireless or wired connections. In one embodiment, network 204 may facilitate communication between computing device 202 and client system 206.

Figure 3:
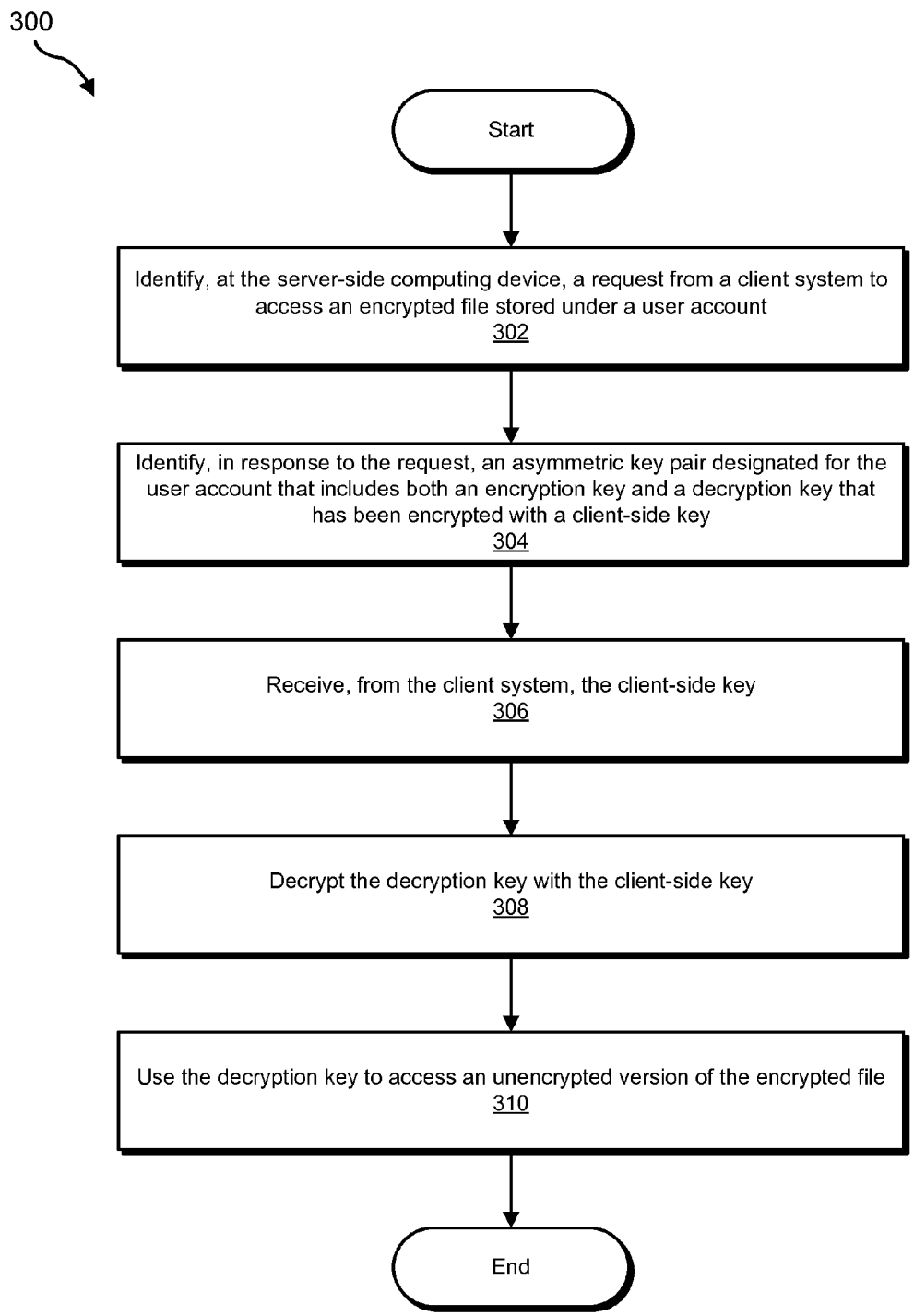
FIG. 3 is a flow diagram of an exemplary method for secure third-party data storage.

FIG. 3 is a flow diagram of an exemplary computer-implemented method 300 for secure third-party data storage. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may identify, at a server-side computing device, a request from a client system to access an encrypted file stored under a user account. For example, at step 302 identification module 104 may, as part of computing device 202 in FIG. 2, identify request 210 from client system 206 to access encrypted file 242 stored under user account 240. In both of the above examples, the requested access may require or involve decryption of the encrypted file.

In some examples, the server-side computing device may operate as part of a third-party storage system. As used herein, the term "third-party storage system" may refer to any type or form of storage system, including a cloud-based storage system, that is capable of storing data on behalf of a user. In some examples, the third-party storage system may store data for multiple distinct entities. In at least one example, the entities that store data with the third-party storage system may require data security against each other (in order to, e.g., prevent unprivileged access of data across entities), against intruders (e.g., entities not authorized to access data stored within the third-party storage system), and/or one or more administrators of the third-party storage system. In some examples, the third-party storage system may represent or include a single-instance storage system (i.e., a storage system configured to only store a single instance of each item of content for multiple owners).

Accordingly, the client system may, in turn, include any system for facilitating the use of a third-party storage system. In some examples, the client system may be owned and/or administrated by an entity distinct from an owner and/or administrator of the server-side computing device.

As used herein, the term "file" may refer to any suitable unit of data, including, without limitation, a file, data object, data segment, portion of a data stream, database, database entry, and/or electronic document. In addition, the phrase "user account" may refer to any identifier and/or privilege system that may correspond to a data owner (used, e.g., to identify data owned by the data owner and/or to secure data owned by the data owner for use by the data owner).

Identification module 104 may identify any of a variety of types of requests. For example, as will be explained in greater detail below, identification module 104 may identify a request to retrieve an unencrypted version of the encrypted file for the client system. Additionally or alternatively, identification module 104 may identify a request to share an accessible version of the file with another user account. In some examples, identification module 104 may identify a request to perform one or more procedures on the file (e.g., procedures that require access to an unencrypted version of the encrypted file).

Identification module 104 may receive the request in any of a variety of contexts. For example, identification module 104 may receive a user-initiated request from the client system. Additionally or alternatively, and as will be explained in greater detail below, identification module 104 may receive an implicit request to access the encrypted file simply by receiving a client-side key from the client system that enables access to the encrypted file.

Returning to FIG. 3, at step 304 one or more of the systems described herein may identify, in response to the request, an asymmetric key pair designated for the user account that includes both an encryption key and a decryption key that has been encrypted with a client-side key. For example, at step 304 key module 106 may, as part of computing device 202 in FIG. 2, identify, in response to request 210, an asymmetric key pair 220 designated for user account 240 that includes both an encryption key 222 and an encrypted decryption key 224 that has been encrypted with client-side key 230.

As used herein, the phrase "asymmetric key pair" may refer to any pair of cryptographic keys that includes both an encryption key (or "public key") and a decryption key (or "private key"). The encryption key may include any key that does not require secrecy in order to secure data encrypted with the key. For example, the encryption key may be used to encrypt data using an asymmetric key algorithm. Consequently, decrypting data encrypted with the encryption key may require the corresponding decryption key of the asymmetric key pair. In some examples, the asymmetric key pair may be stored on and/or by a third-party storage system. In at least one example, neither the encryption key nor the decryption key may be distributed outside the third-party storage system.

In addition, the phrase "client-side key," as used herein, may refer to any suitable cryptographic key or keys for encrypting and/or decrypting the decryption key of the asymmetric key pair. In some examples, the client-side key may include a symmetric key (e.g., a key usable for both encrypting data and decrypting said data). For example, the client-side key may be configured to encrypt and decrypt data according to an Advanced Encryption Standard specification (e.g., AES-256). In some examples, the client-side key may be generated on the client system. For example, the client-side key may be generated using a key derivation function, such as a password-based key derivation function (e.g., PBKDF2).

In some examples, the client-side key may be cached on the client system. Additionally or alternatively, the client-side key may be generated as needed from a password (e.g., generated either at the client system or at a third-party storage system). In some examples, the client-side key may be retrieved from an external key store. As will be explained in greater detail below, in some examples the client-side key may not be stored on the server-side computing device and/or within a third-party storage system implemented by the server-side computing device. In some examples, the client-side key may be accessible only by a corresponding client. This client may correspond to an organization, a group with shared secrets, a computing device, and/or any other suitable entity.

In some examples, one or more of the systems described herein may have used the encryption key within the asymmetric key pair to encrypt the encrypted file. For example, one or more of the systems described herein may receive the unencrypted version of the encrypted file from the client system and then generate the encrypted file. These systems may generate the encrypted file by generating a file key based on at least one characteristic of the unencrypted version of the encrypted file and then encrypting the unencrypted version of the encrypted file with the file key. For example, these systems may derive a hash of the unencrypted version of the encrypted file and base the file key on the hash. In this manner, the systems and methods described herein may produce identical encrypted files from identical unencrypted files, allowing for deduplication across clients.

For example, the systems described herein may deduplicate the encrypted file with an additional encrypted file that is encrypted with the file key. Upon generating the file key, these systems may encrypt the file key with the encryption key. The term "deduplication," as used herein, may refer to one or more operations related to reducing the amount of storage space used in a single-instance data storage system, including operations for detecting and preventing data from being redundantly stored to the single-instance data storage system. Deduplication may be performed using any suitable deduplication technology or algorithm. In some examples, deduplication may include file-level deduplication. Additionally or alternatively, deduplication may include block-level deduplication.

In addition to encrypting the unencrypted version of the encrypted file, in some examples one or more of the systems described herein may perform one or more operations based on the unencrypted version of the encrypted file (e.g., before encrypting the unencrypted version of the encrypted file and thereby losing access to the unencrypted version of the encrypted file). For example, one or more of the systems described herein may index the contents of the unencrypted version of the encrypted file, perform an anti-malware scan on the unencrypted version of the encrypted file, generate a preview of the contents of the unencrypted version of the encrypted file, etc. In these examples, these systems may associate metadata generated from the unencrypted version of the encrypted file with the encrypted file once the encrypted file is encrypted.

Key module 106 may identify the asymmetric key pair designated for the user account in any suitable manner. In some examples, a third-party storage system may host data for multiple user accounts, each with a designated and distinct asymmetric key pair. Accordingly, key module 106 may identify the asymmetric key pair for the user account according to one or more identifiers and/or credentials provided by the client system.

Returning to FIG. 3, at step 306 one or more of the systems described herein may receive, from the client system, the client-side key. For example, at step 306 receiving module 108 may, as part of computing device 202 in FIG. 2, receive client-side key 230 from client system 206.

As mentioned earlier, in some examples the client-side key may not be stored on the server side (i.e., on the server-side computing device and/or an associated third-party storage system). For example, receiving module 108 may receive the client-side key and store the client-side key in volatile memory without storing the client-side key in non-volatile memory. As used herein, the phrase "volatile memory" may refer to any non-persistent and/or temporary storage location. In some examples, the phrase "volatile memory" may refer to random access memory. In addition, the phrase "non-volatile memory" may refer to any persistent storage location. For example, the phrase "non-volatile memory" may refer to a storage device used by a file system to store one or more files. In some examples, receiving module 108 may receive the client-side key and not preserve the client-side key after use.

For example, receiving module 108 may discard the client-side key after a session with the client system has terminated.

Receiving module 108 may receive the client-side key from the client system in any of a variety of ways. For example, receiving module 108 may receive the client-side key from the client system directly. Additionally or alternatively, receiving module 108 may receive the client-side key from the client system by receiving data representing the client-side key and from which the client-side key may be generated. For example, receiving module 108 may receive a password for a key derivation function from the client system and use this key derivation function to generate the client-side key from the password. In this example, receiving module 108 may also keep the password only in non-volatile memory and/or discard the password upon using the password to generate the client-side key.

Returning to FIG. 3, at step 308 one or more of the systems described herein may decrypt the decryption key with the client-side key. For example, at step 308 decryption module 110 may, as part of computing device 202 in FIG. 2, decrypt encrypted decryption key 224 with client-side key 230 (resulting, e.g., in decryption key 226).

Decryption module 110 may decrypt the decryption key in any suitable manner. For example, decryption module 110 may apply the client-side key to the decryption key according to a predetermined symmetric key algorithm to generate a decrypted version of the decryption key.

At step 310, one or more of the systems described herein may use the decryption key to access an unencrypted version of the encrypted file. For example, at step 310 access module 112 may, as part of computing device 202 in FIG. 2, use decryption key 226 to access an unencrypted version of encrypted file 242 (e.g., file 244).

Access module 112 may use the decryption key to access the unencrypted version of the encrypted file in any of a variety of ways. For example, access module 112 may identify a file key used to encrypt the encrypted file. In this example, the file key may be encrypted with the encryption key. Accordingly, access module 112 may decrypt the file key with the decryption key and then decrypt the encrypted file with the file key.

Access module 112 may access the unencrypted version of the encrypted file to any of a variety of ends. For example, as detailed above, the request from the client system may include a request to retrieve an unencrypted version of the encrypted file. Accordingly, access module 112 may transmit the unencrypted version of the encrypted file to the client system (e.g., in response to the request).

Figure 4:
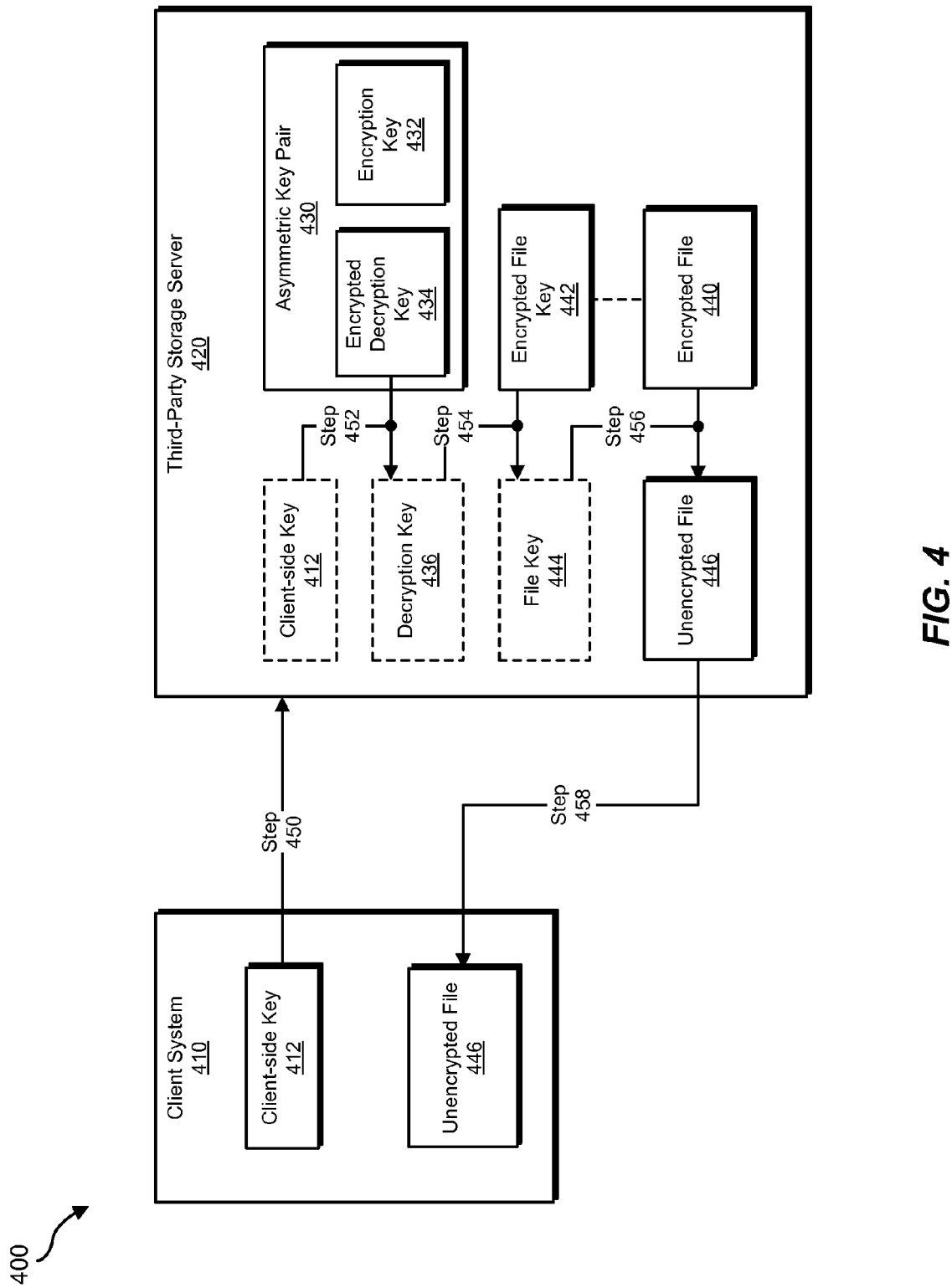
FIG. 4 is a block diagram of an exemplary system for secure third-party data storage.

FIG. 4 illustrates an exemplary system 400 for secure third-party data storage. As shown in FIG. 4, exemplary system 400 may include a client system 410 configured to store one or more files via a third-party storage service facilitated by third-party storage server 420. For example, client system 410 may have previously transmitted an unencrypted file 446 to third-party storage server 420. Third-party storage server 420 may have identified an asymmetric key pair 430 associated with client system 410 and encrypted unencrypted file 446 using an encryption key 432. In one example, client system 410 may attempt to retrieve unencrypted file 446, now stored on third-party storage server 420 as encrypted file 440. For example, at step 450 client system 410 may transmit a message to third-party storage server 420 requesting unencrypted file 446 and including client-side key 412. Third-party storage server 420 may accordingly receive client-side key 412 and maintain client-side key 412 in memory for use.

At step 452, third-party storage server 420 may identify asymmetric key pair 430 and use decrypt an encrypted decryption key 434 with client-side key 412 to result in decryption key 436. At step 454, third-party storage server 420 may use decryption key 436 to decrypt an encrypted file key 442 to obtain a file key 444 for encrypted file 440. At step 456, third-party storage server 420 may use file key 444 to decrypt encrypted file 440 and obtain unencrypted file 446. At step 458, third-party storage server 420 may transmit unencrypted file 446 to client system 410, fulfilling the request by client system 410. Third-party storage system 420 may additionally discard client-side key 412, decryption key 436, and file key 444, and delete unencrypted file 446.

Returning to step 310 of FIG. 3, in some examples, access module 112 may access the unencrypted version of the encrypted file to generate metadata describing the unencrypted version of the encrypted file. In some examples, access module 112 may then store the metadata in relation to the encrypted file so that the metadata describing the encrypted file remains available even after the unencrypted version of the encrypted file is no longer directly accessible on a third-party storage system.

For example, access module 112 may perform a security scan on the unencrypted version of the encrypted file (e.g., to determine whether the encrypted file includes any malware or poses any other security risk). In another example, access module 112 may index the unencrypted version of the encrypted file based on content within the unencrypted version of the encrypted file (e.g., to facilitate searching for the encrypted file based on its content without access to the unencrypted version of the encrypted file). In an additional example, access module 112 may generate a preview of the unencrypted version of the encrypted file based on content within the unencrypted version of the encrypted file (e.g., to facilitate browsing through encrypted files without access to the unencrypted versions of the encrypted files). As detailed above, in some examples one or more systems described herein may additionally or alternatively perform one or more of the operations described above when the unencrypted version of the encrypted file is first uploaded (e.g., before encryption).

In some examples, access module 112 may provide access to the unencrypted version of the encrypted file to another party. For example, access module 112 may provide access to the unencrypted version of the encrypted file to another user account. In this example, an additional asymmetric key pair may be designated for the additional user account, including an additional encryption key and an additional decryption key. The additional decryption key may be encrypted with an additional client-side key (pertaining, e.g., to an additional client system corresponding to the additional user account). In this example, access module 112 may provide access to the unencrypted version of the encrypted file to the additional user account by first identifying a file key used to encrypt the encrypted file. Since the encrypted file may pertain to the user account, the file key may be encrypted with the encryption key (i.e., the encryption key of the asymmetric key pair corresponding to the user account). Access module 112 may then decrypt the file key with the decryption key and encrypt a copy of the file key with the additional encryption key. In this manner, the additional user account may have access to the encrypted file (by, e.g., submitting the additional client-side key to decrypt the file key, allowing for decryption of the encrypted file by the file key).

Figure 5:
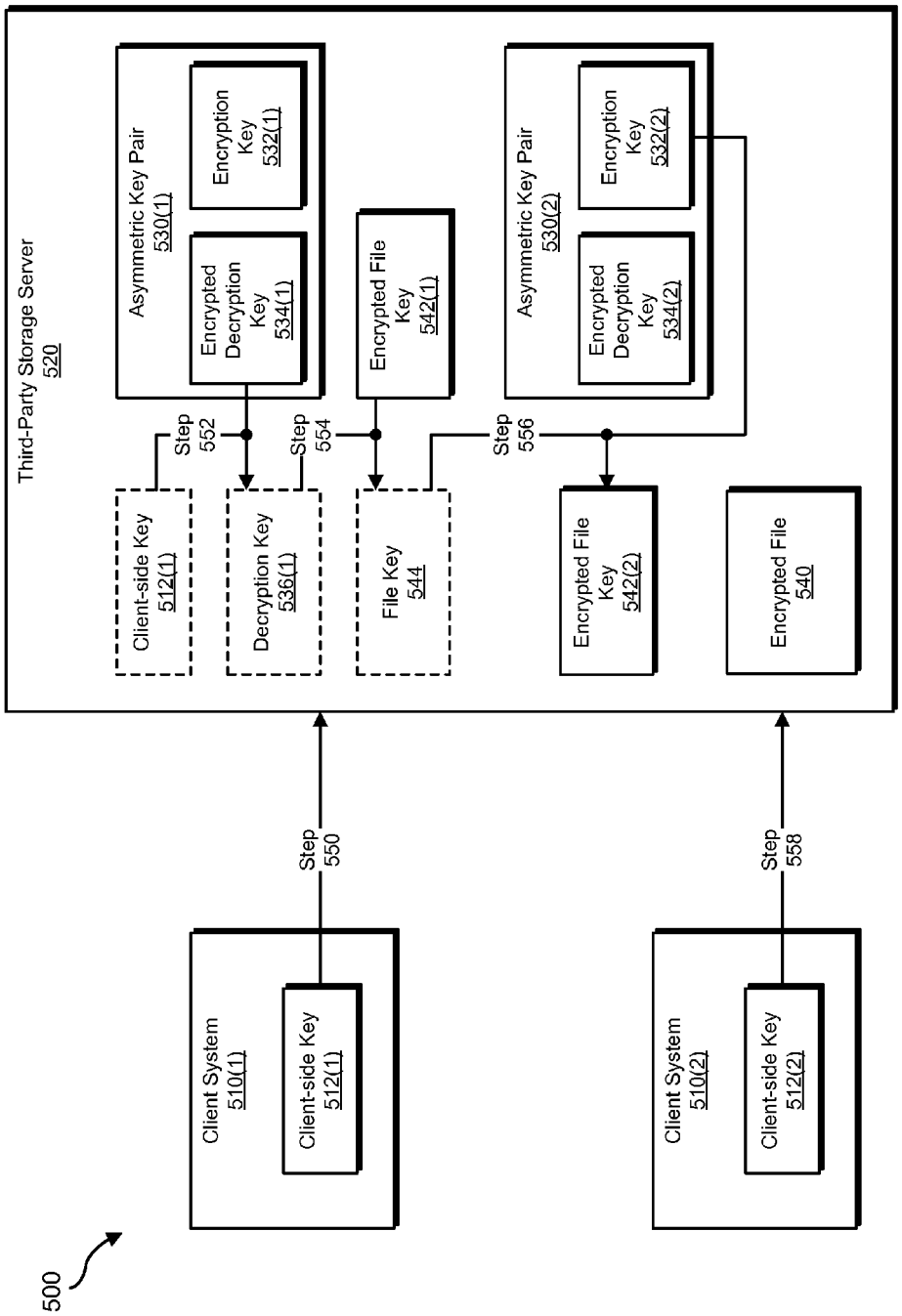
FIG. 5 is a block diagram of an exemplary system for secure third-party data storage.

FIG. 5 illustrates an exemplary system 500 for secure third-party data storage. As shown in FIG. 5, exemplary system 500 may include client systems 510(1) and 510(2) configured to store and/or access one or more files via a third-party storage service facilitated by third-party storage server 520. For example, third-party storage server 520 may store an encrypted file 540 on behalf of client system 510(1). In this example, an asymmetric key pair 530(1) may correspond to client system 510(1) and an asymmetric key pair 530(2) may correspond to client system 510(2). Accordingly, encrypted file 540 may be encrypted with a file key 544 that is encrypted with an encryption key 532(1) and stored as an encrypted file key 542(1).

At step 550, client system 510(1) may transmit a request to third-party storage server 520 to share access to the unencrypted contents of encrypted file 540 with client system 510(2). The request may include a client-side key 512(1). Third-party storage server 520 may receive client-side key 512(1) and, at step 552, decrypt an encrypted decryption key 534(1) with client-side key 512(1) to obtain a decryption key 536(1). At step 554, third-party storage server 520 may decrypt encrypted file key 542(1) with decryption key 536(1) to obtain file key 544. At step 556, third-party storage server 520 may encrypt file key 544 with an encryption key 532(2) to obtain encrypted file key 542(2), and may store encrypted file key 542(2) for future use. At step 558, third-party storage server 520 may receive a request from client system 510(2) to access the unencrypted contents of encrypted file 540. The request may include a client-side key 512(2), allowing third-party storage server 520 to decrypt an encrypted decryption key 534(2) and, thereby, decrypt encrypted file key 542(2) in order to obtain file key 544 and decrypt encrypted file 540.

In some examples, access module 112 may provide access to the unencrypted version of the encrypted file to the additional user account by allowing an additional client-side key corresponding to the additional user account to decrypt the decryption key of the user account. For example, access module 112 may identify an additional user account designated to access the unencrypted version of the encrypted file. In this example, an additional asymmetric key pair may be designated for the additional user account that includes both an additional encryption key and an additional decryption key. The additional decryption key may be encrypted with an additional client-side key (pertaining, e.g., to an additional client system corresponding to the additional user account).

In the above-described example, access module 112 may provide access to the unencrypted version of the encrypted file to the additional user account by encrypting the decryption key with the additional encryption key (and, e.g., storing the encrypted decryption key for later use with the additional user account). For example, one or more of the systems described herein may later identify an additional request from an additional client system to further access the encrypted file via the additional user account. These systems may then decrypt the decryption key with the additional decryption key and use the decryption key to access the unencrypted version of the encrypted file via the additional user account (by, e.g., using the decryption key to decrypt a file key with which the encrypted file has been encrypted and then decrypting the encrypted file with the file key). In some examples, the above-described approach may be used to share multiple files between the user account and the additional user account. This approach may also eliminate some cryptographic processing steps (by, e.g., not requiring the generation of a separate encrypted file key for each file shared).

Figure 6:
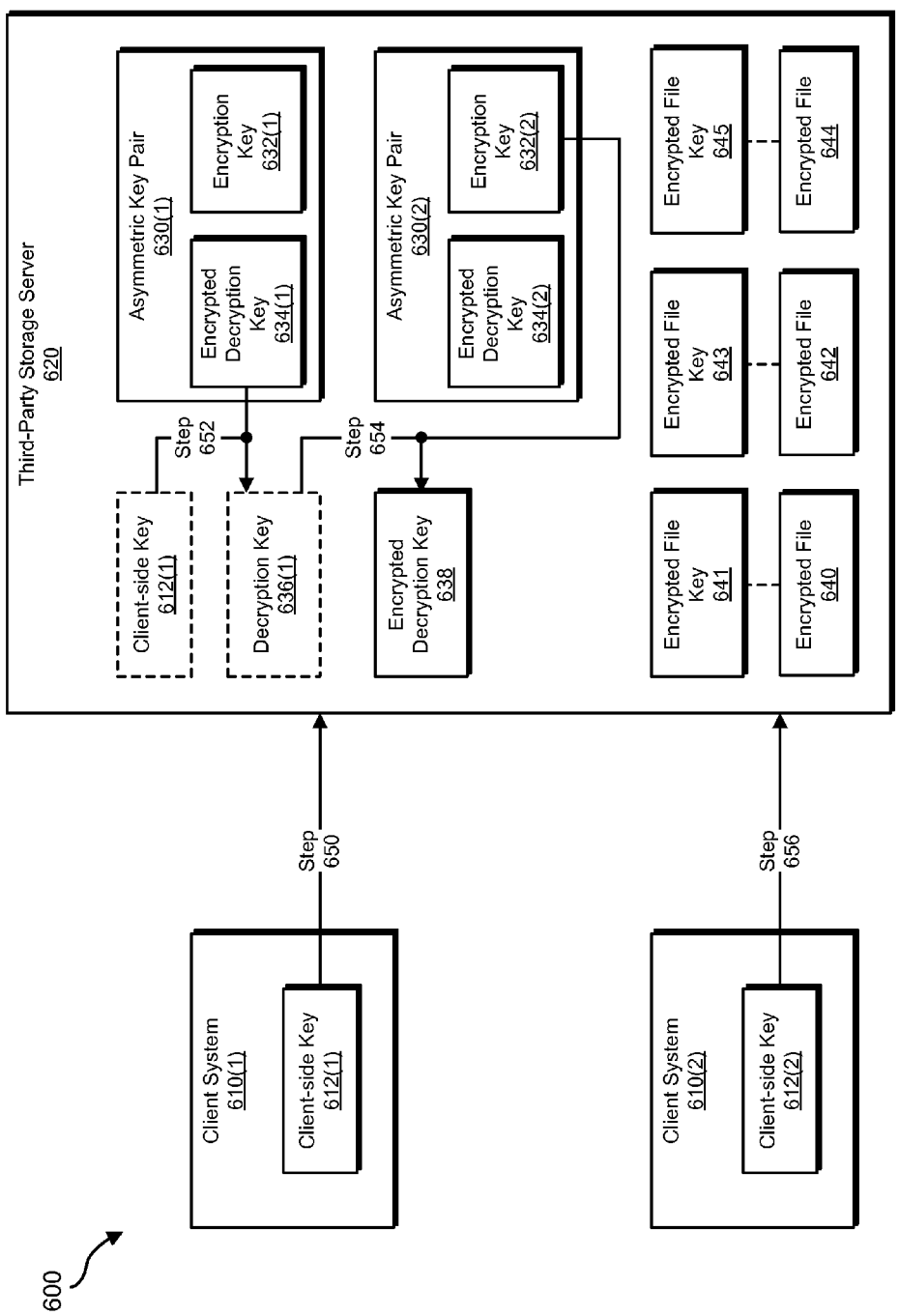
FIG. 6 is a block diagram of an exemplary system for secure third-party data storage.

FIG. 6 illustrates an exemplary system 600 for secure third-party data storage. As shown in FIG. 6, exemplary system 600 may include client systems 610(1) and 610(2) configured to store and/or access one or more files via a third-party storage service facilitated by third-party storage server 620. For example, third-party storage server 620 may store encrypted files 640, 642, and 644 on behalf of client system 610(1). In this example, an asymmetric key pair 630(1) may correspond to client system 610(1) and an asymmetric key pair 630(2) may correspond to client system 610(2). Accordingly, encrypted files 640, 642, and 644 may be encrypted with encrypted file keys 641, 643, and 645 respectively, which may, in turn, be encrypted with encryption key 632(1).

At step 650, client system 610(1) may transmit a request to third-party storage server 620 to share access to the unencrypted contents of encrypted files 640, 642, and 644 with client system 610(2). The request may include a client-side key 612(1). Third-party storage server 620 may receive client-side key 612(1) and, at step 652, decrypt an encrypted decryption key 634(1) with client-side key 612(1) to obtain decryption key 636(1).

At step 654, third-party storage server 620 may encrypt decryption key 636(1) with an encryption key 632(2) to obtain an encrypted decryption key 638. Third-party storage server 620 may then store encrypted decryption key 638 for future use. Subsequently, at step 656, client system 610(2) may send a request, including client-side key 612(2), to third-party storage server 620 to access one or more of encrypted files 640, 642, and 644. Third-party storage server 620 may then provide the access by decrypting encrypted decryption key 638 with an encrypted decryption key 634(2) to obtain decryption key 636(1) and decrypting one or more of encrypted file keys 641, 643, and 645 with decryption key 636(1) to obtain the unencrypted contents of one or more of encrypted files 640, 642, and 644.

Returning to step 310 of FIG. 3, in some examples access module 112 may provide access to the unencrypted version of the encrypted file based on a membership to a group of user accounts. For example, access module 112 may identify an additional asymmetric key pair designated for a group of user accounts that include the user account. The additional asymmetric key pair may include an additional encryption key and an additional decryption key. The additional decryption key may be encrypted with an encryption key that corresponds to the asymmetric key pair of the user account. Access module 112 may then decrypt the additional decryption key with the decryption key. Access module 112 may further identify a file key used to encrypt the encrypted file. The file key may be encrypted with the additional encryption key. Accordingly, access module 112 may decrypt the file key with the additional decryption key and decrypt the encrypted file with the file key. In an additional example, the encrypted file may be encrypted with the additional encryption key instead of a file key. In this example, access module 112 may simply decrypt the encrypted file with the additional decryption key.

Figure 7:
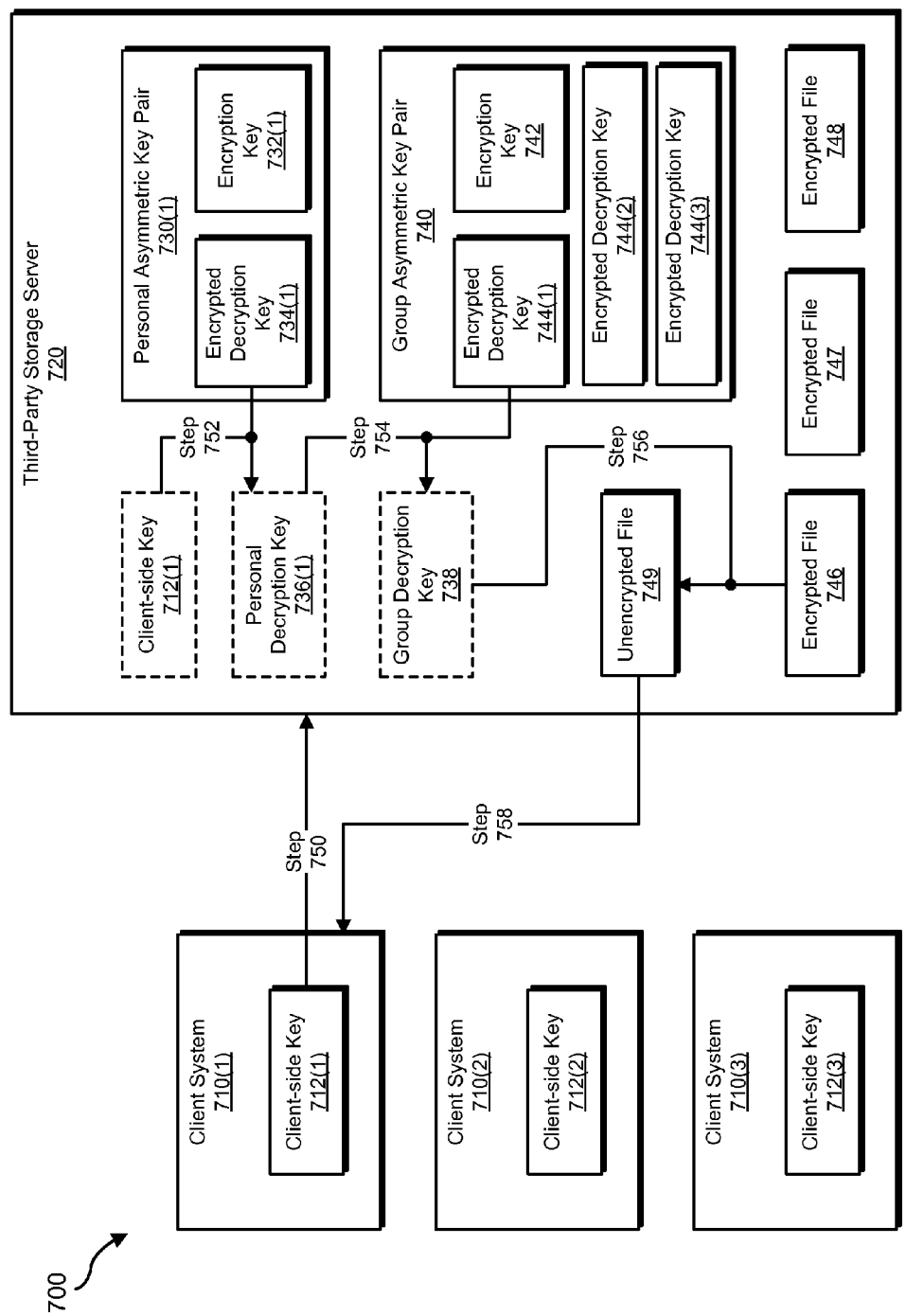
FIG. 7 is a block diagram of an exemplary system for secure third-party data storage.

FIG. 7 illustrates an exemplary system 700 for secure third-party data storage. As shown in FIG. 7, exemplary system 700 may include client systems 710(1), 710(2), and 710(3) configured to store and/or access one or more files via a third-party storage service facilitated by third-party storage server 720. For example, third-party storage server 720 may store encrypted files 746, 747, and 748 on behalf of client systems 710(1)-(3). In this example, a personal asymmetric key pair 730(1) may correspond to client system 710(1) and a group asymmetric key pair 740(2) may correspond to client systems 710(1)-(3) as a group (with, e.g., client systems 710(1), 710(2), and 710(3) each having an encrypted version of group decryption key 738 with encrypted decryption keys 744(1), 744(2), and 744(3), respectively). Encrypted files 746, 747, and 748 may be encrypted with an encryption key 742.

At step 750, client system 710(1) may transmit a request to third-party storage server 720 to access the unencrypted contents of encrypted file 740. The request may include a client-side key 712(1). Third-party storage server 720 may receive client-side key 712(1) and, at step 752, decrypt an encrypted decryption key 734(1) with client-side key 712(1) to obtain a personal decryption key 736(1). At step 754, third-party storage server 720 may decrypt an encrypted decryption key 744(1) with personal decryption key 736(1) to obtain group decryption key 738. At step 756, third-party storage server 720 may decrypt encrypted file 746 with group decryption key 738 to obtain an unencrypted file 749. At step 758, third-party storage server 720 may transmit unencrypted file 749 to client system 710(1). In a similar manner, third-party storage server 720 may obtain unencrypted versions of encrypted file 746, 747, and/or 748 for client systems 710(2) and 710(3) by decrypting encrypted decryption keys 744(2) and 744(3) with client-side keys 712(2) and 712(3), respectively. Alternatively, as described earlier, in some examples encrypted files 746, 747, and 748 may each be encrypted with respective file keys, which may, in turn, each be encrypted with encryption key 742. In these examples, third-party storage server 720 may decrypt the file keys with group decryption key 738 and then decrypt encrypted files 746, 747, and 748 with the respective file keys.

As explained above, by maintaining asymmetric key pairs for encrypting and decrypting secured data on a third-party storage server and encrypting the decryption keys of the asymmetric key pairs with encryption keys maintained by clients, the systems and methods described herein may securely store and encrypt client data without storing the client-side decryption keys required to access the secured data in an unencrypted state. These systems and methods may thereby prevent an attacker who has gained access to a third-party storage system from accessing the secured data in an unencrypted state, while still allowing and/or facilitating the sharing, deduplication, analysis, and/or indexing of this secured data.

Figure 8:
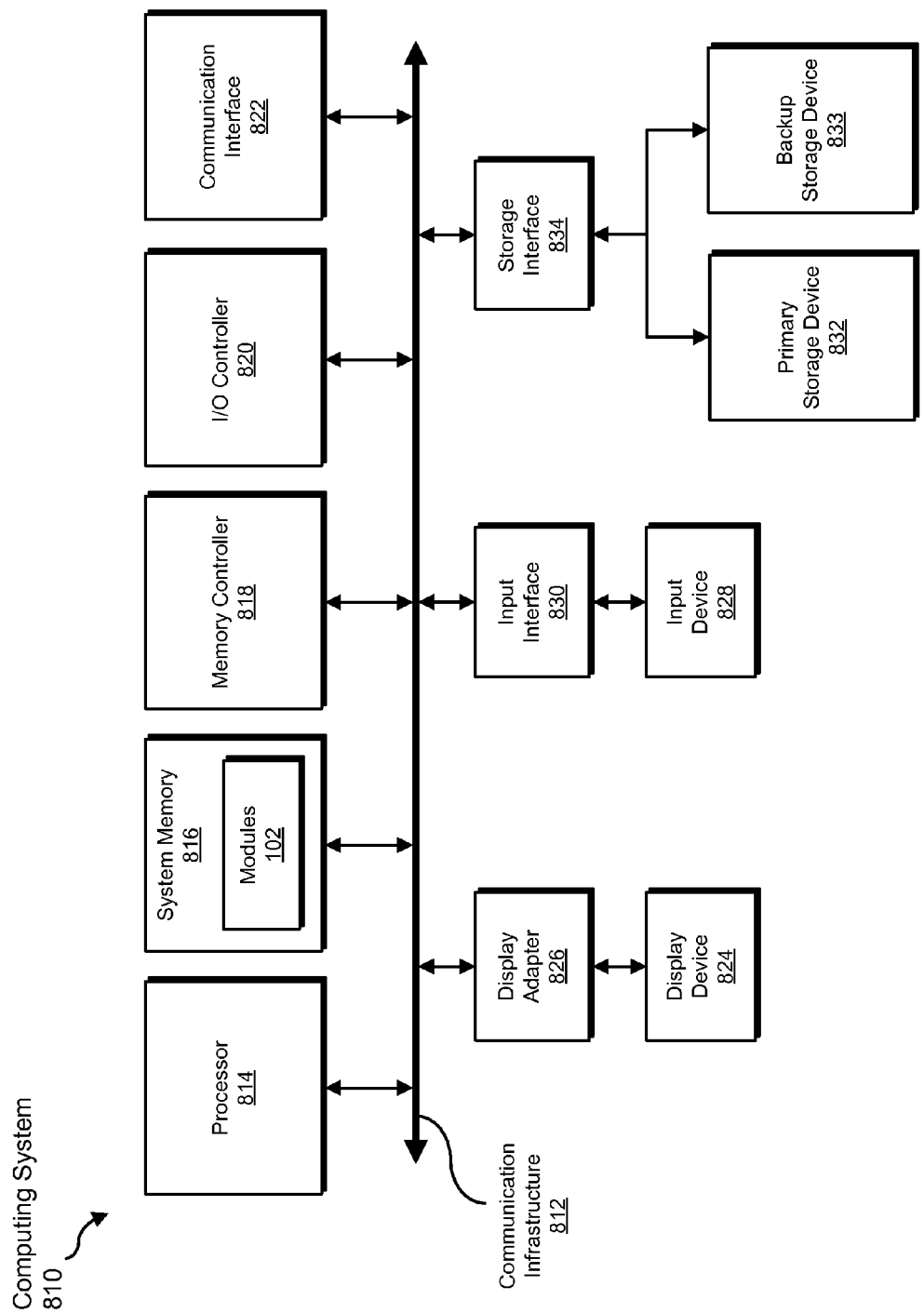
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the identifying, receiving, generating, encrypting, deduplicating, storing, decrypting, using, accessing, transmitting, generating, performing, indexing, and providing steps described herein. All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 810. All or a portion of the computer program stored on the computer-readable-storage medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
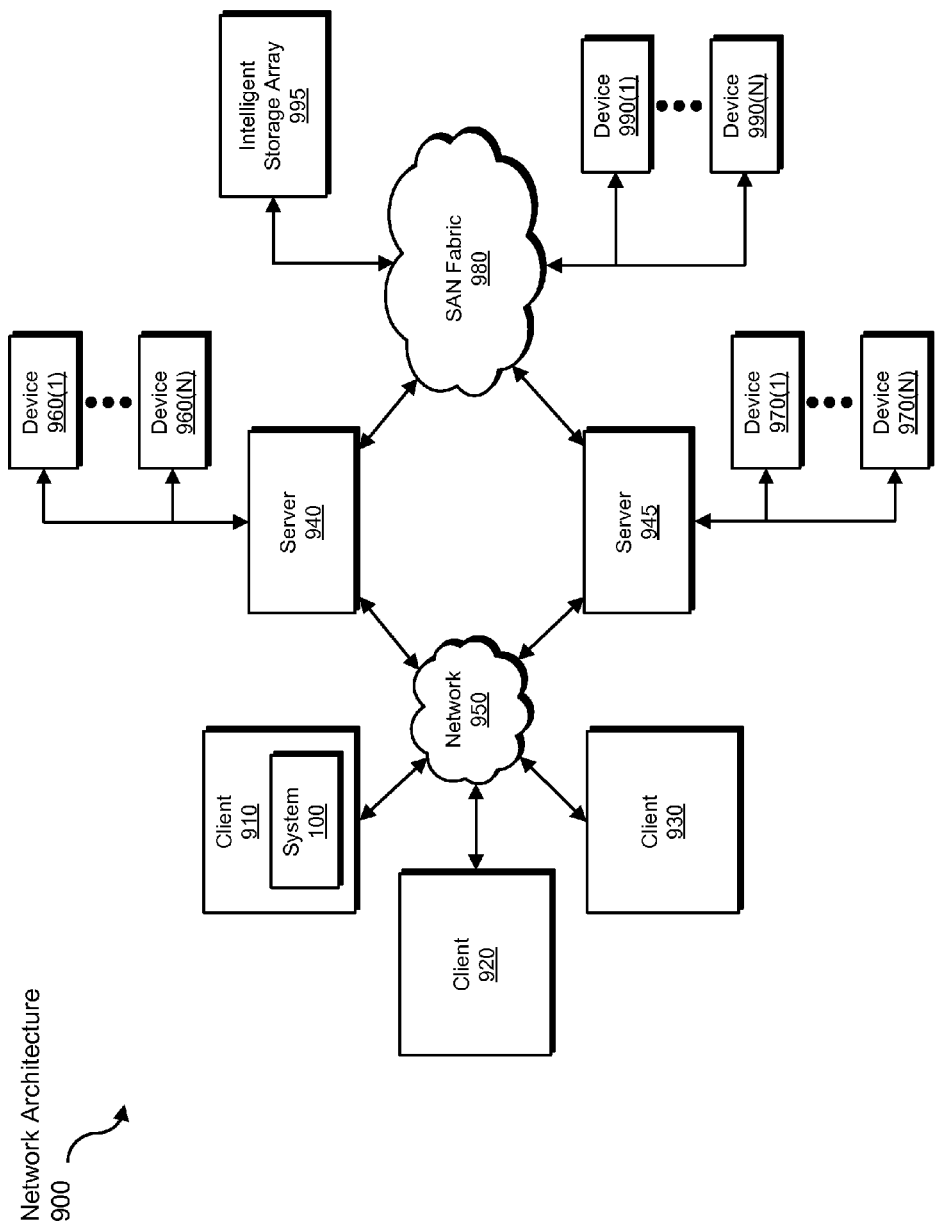
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the identifying, receiving, generating, encrypting, deduplicating, storing, decrypting, using, accessing, transmitting, generating, performing, indexing, and providing steps disclosed herein. All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990 (1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for secure third-party data storage.

Figure 10:
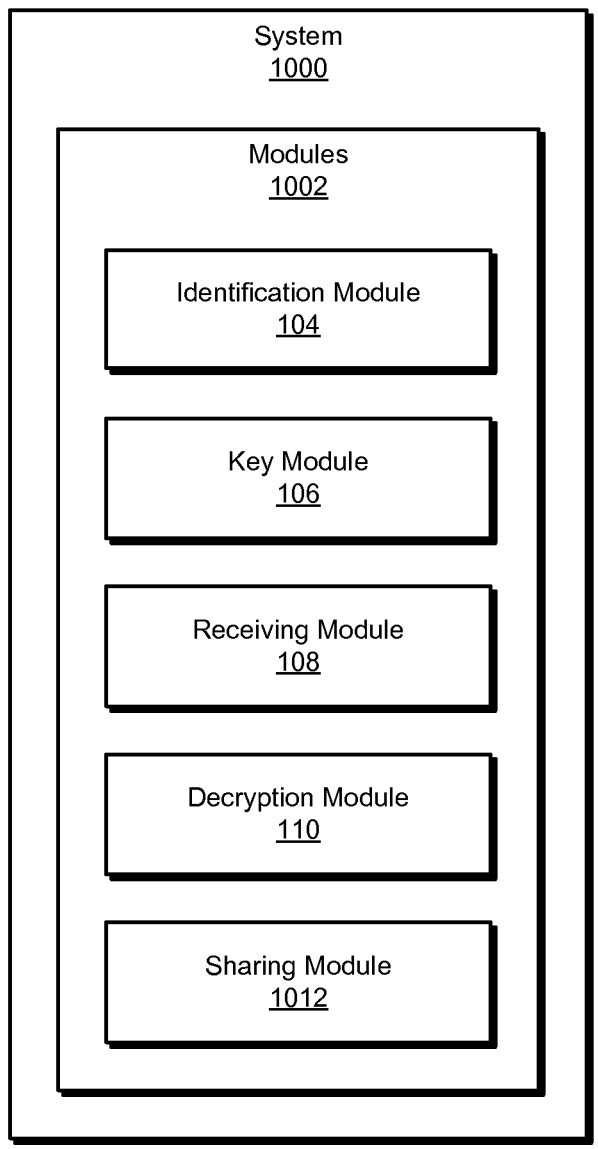
FIG. 10 is a block diagram of an exemplary system for secure third-party data storage.

FIG. 10 illustrates an exemplary system 1000 for secure third-party data storage. As shown in FIG. 10, exemplary system 100 may include modules 1002. Modules 1002 may include identification module 104, key module 106, receiving module 108, decryption module 110, and a sharing module 1012.

As will be described in greater detail below, identification module 104 may identify, at a server-side computing device, a request from a client system to share access to an encrypted file stored under a user account. Key module 106, receiving module 108, and decryption module 110 may be programmed to decrypt the file key of an encrypted file. Sharing module 1012 may be programmed to generate a temporary encryption key, encrypt the file key of the encrypted file with the temporary encryption key, and provide the temporary encryption key for sharing (e.g., without storing the temporary encryption key).

In certain embodiments, sharing module 1012 may represent one or more software applications or programs that, when executed by a computing system, may cause the computing system to perform one or more of the steps disclosed herein. For example, as will be described in greater detail below, sharing module 1012 may represent software modules configured to run on one or more computing devices, such as computing system 810 in FIG. 8 and/or portions of exemplary network architecture 900 in FIG. 9. Sharing module 1012 may also represent all or portions of one or more special-purpose computers configured to perform one or more tasks associated with the steps disclosed herein.

Figure 11:
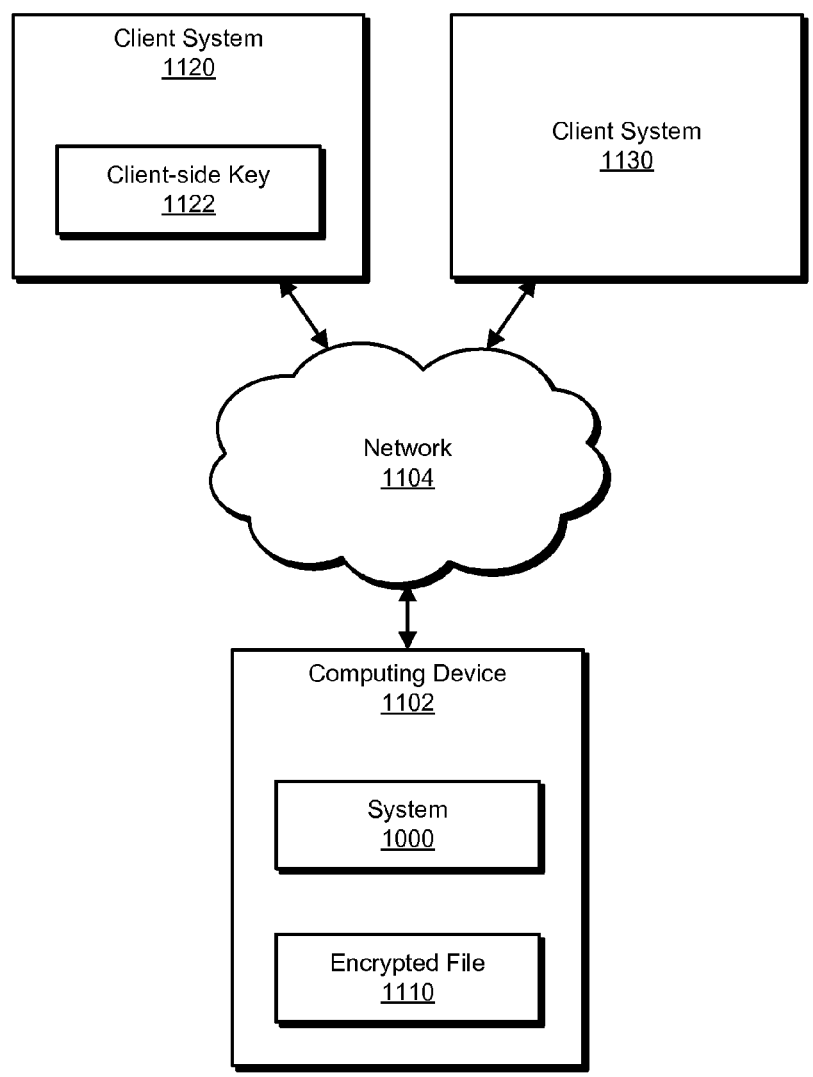
FIG. 11 is a block diagram of an exemplary system for secure third-party data storage.

FIG. 11 is a block diagram of an exemplary system 1100 in which a network 1104 may connect a computing device 1102 to a client system 1120 and a client system 1130. Computing device 1102 and client systems 1120 and 1130 may represent any type or form of computing device capable of reading computer-executable instructions. Computing device 1102 may include system 1000 of FIG. 10.

Computing device 1102 may store an encrypted file 1110 (e.g., on behalf of a user of client system 1120). Client system 1120 may store a client-side key 1122 useful for accessing the unencrypted contents of encrypted file 1110. The user of client system 1120 may wish to temporarily grant access to the unencrypted contents of encrypted file 1110 to others, such as a user of client system 1130, without giving the user of client system 1130 a copy of client-side key 1122 and without computing device 1102 storing a copy of client-side key 1122. Computing device 1102 may therefore run sharing module 1012 within system 1000 on computing device 1102 to provide a temporary decryption key useful for allowing, e.g., the user of client system 1130 to have temporary access to the unencrypted contents of encrypted file 1110.

Figure 12:
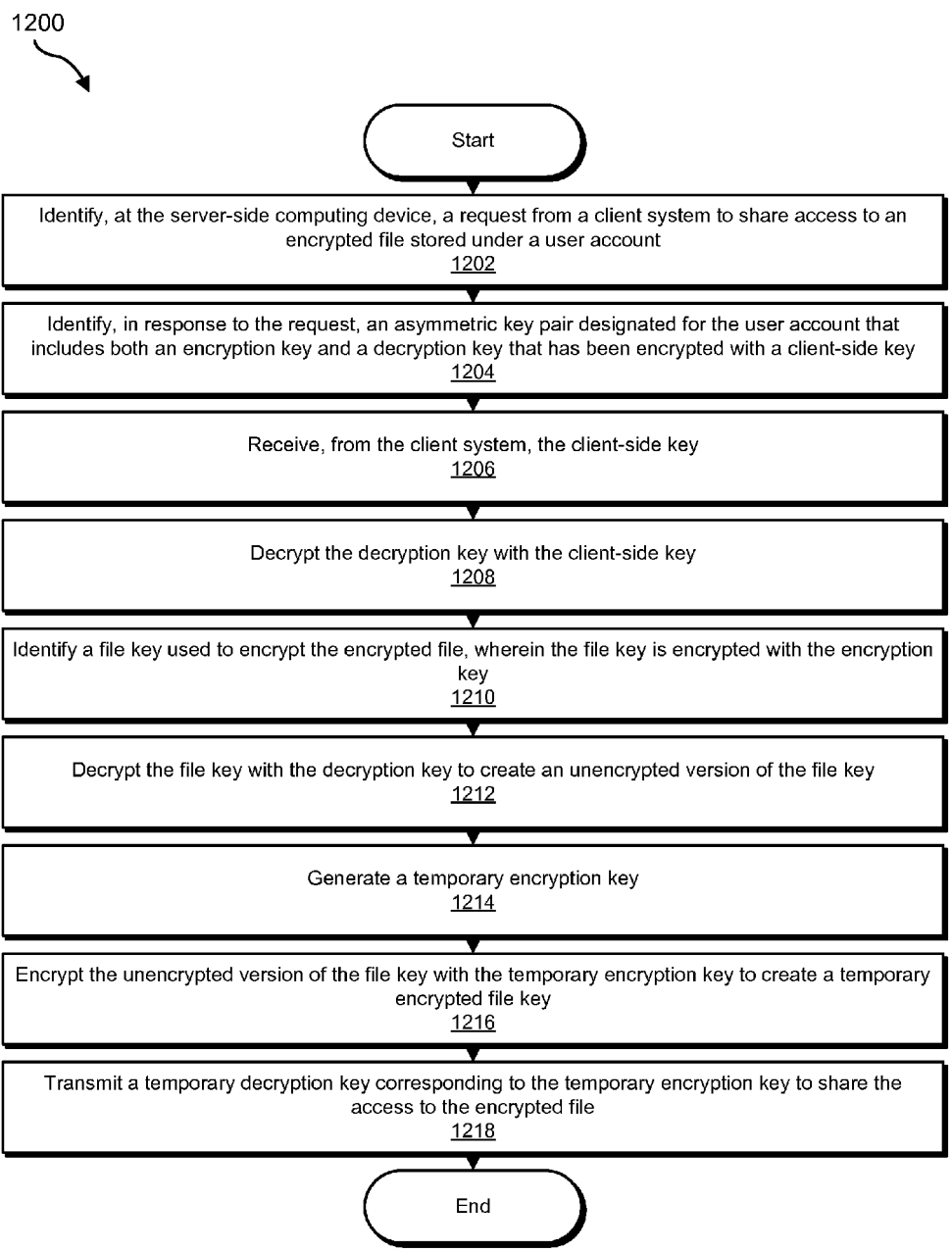
FIG. 12 is a flow diagram of an exemplary method for secure third-party data storage.

FIG. 12 illustrates an exemplary method 1200 for secure third-party data storage. In some examples, the steps in FIG. 12 may be performed by modules 1002 of system 1000. For example, at step 1202 identification module 104 may identify, at the server-side computing device, a request from a client system to share access to an encrypted file (e.g., access to unencrypted contents of the encrypted file) stored under a user account.

Identification module 104 may identify any of a variety of types of requests. For example, as will be explained in greater detail below, identification module 104 may identify a request for a temporary decryption key useful for accessing unencrypted contents of the encrypted file. Additionally or alternatively, identification module 104 may identify a request for a link (e.g., that includes decryption information) to access unencrypted contents of the encrypted file.

Returning to FIG. 12, at step 1204, key module 106 may identify, in response to the request, an asymmetric key pair designated for the user account that includes both an encryption key and a decryption key that has been encrypted with a client-side key.

In some examples, the client-side key may be cached on the client system. Additionally or alternatively, the client-side key may be generated as needed from a password (e.g., generated either at the client system or at a third-party storage system). In some examples, the client-side key may be retrieved from an external key store. As will be explained in greater detail below, in some examples the client-side key may not be stored on the server-side computing device and/or within a third-party storage system implemented by the server-side computing device. In some examples, the client-side key may be accessible only by a corresponding client. This client may correspond to an organization, a group with shared secrets, a computing device, and/or any other suitable entity.

In some examples, one or more of the systems described herein may have used the encryption key within the asymmetric key pair to encrypt the encrypted file. For example, one or more of the systems described herein may receive the unencrypted version of the encrypted file from the client system and then generate the encrypted file. These systems may generate the encrypted file by generating a file key based on at least one characteristic of the unencrypted version of the encrypted file and then encrypting the unencrypted version of the encrypted file with the file key. For example, these systems may derive a hash of the unencrypted version of the encrypted file and base the file key on the hash. In this manner, the systems and methods described herein may produce identical encrypted files from identical unencrypted files, allowing for deduplication across clients. For example, the systems described herein may deduplicate the encrypted file with an additional encrypted file that is encrypted with the file key. Upon generating the file key, these systems may encrypt the file key with the encryption key.

In addition to encrypting the unencrypted version of the encrypted file, in some examples one or more of the systems described herein may perform one or more operations based on the unencrypted version of the encrypted file (e.g., before encrypting the unencrypted version of the encrypted file and thereby losing access to the unencrypted version of the encrypted file). For example, one or more of the systems described herein may index the contents of the unencrypted version of the encrypted file, perform an anti-malware scan on the unencrypted version of the encrypted file, generate a preview of the contents of the unencrypted version of the encrypted file, etc. In these examples, these systems may associate metadata generated from the unencrypted version of the encrypted file with the encrypted file once the encrypted file is encrypted.

In some examples, the client system may have encrypted the file before sending the encrypted file to the third-party storage system.

Key module 106 may identify the asymmetric key pair designated for the user account in any suitable manner. In some examples, a third-party storage system may host data for multiple user accounts, each with a designated and distinct asymmetric key pair. Accordingly, key module 106 may identify the asymmetric key pair for the user account according to one or more identifiers and/or credentials provided by the client system.

Returning to FIG. 12, at step 1206 receiving module 108 may receive the client-side key from the client system.

As mentioned earlier, in some examples the client-side key may not be stored on the server side (i.e., on the server-side computing device and/or an associated third-party storage system). For example, receiving module 108 may receive the client-side key and store the client-side key in volatile memory without storing the client-side key in non-volatile memory.

Receiving module 108 may receive the client-side key from the client system in any of a variety of ways. For example, receiving module 108 may receive the client-side key from the client system directly. Additionally or alternatively, receiving module 108 may receive the client-side key from the client system by receiving data representing the client-side key and from which the client-side key may be generated. For example, receiving module 108 may receive a password for a key derivation function from the client system and use this key derivation function to generate the client-side key from the password. In this example, receiving module 108 may also keep the password only in non-volatile memory and/or discard the password upon using the password to generate the client-side key.

Returning to FIG. 12, at step 1208 decryption module 110 may decrypt the decryption key with the client-side key.

Decryption module 110 may decrypt the decryption key in any suitable manner. For example, decryption module 110 may apply the client-side key to the decryption key according to a predetermined symmetric key algorithm to generate a decrypted version of the decryption key.

At step 1210, decryption module 110 may identify a file key used to encrypt the encrypted file. The file key may be encrypted with the encryption key. At step 1212, decryption module 110 may decrypt the file key with the decryption key to create an unencrypted version of the file key.

At step 1214, sharing module 1012 may generate a temporary encryption key. Sharing module 1012 may generate the temporary encryption key in any suitable manner. For example, sharing module 1012 may generate a random value for the temporary encryption key. In some examples, the temporary encryption key may include a symmetric encryption key. Additionally or alternatively, the temporary encryption key may include an encryption key within an asymmetric key pair. In some examples, the temporary encryption key may not be stored on the server side (i.e., on the server-side computing device and/or an associated third-party storage system). For example, sharing module 1012 may generate the temporary encryption key and store the temporary encryption key in volatile memory without storing the temporary encryption key in non-volatile memory.

Returning to FIG. 12, at step 1216 sharing module 1012 may encrypt the unencrypted version of the file key with the temporary encryption key to create a temporary encrypted file key. Sharing module 1012 may then store the temporary encrypted file key on the server-side computing device and/or an associated third-party storage system with an association to the encrypted file.

At step 1218, sharing module 1012 may transmit a temporary decryption key corresponding to the temporary encryption key to share the access to the encrypted file.

In some examples, the temporary decryption key may include a decryption key in an asymmetric key pair with the temporary encryption key. In some examples, the temporary encryption key may include a symmetric key and the temporary decryption key may be equivalent to the temporary encryption key.

Sharing module 1012 may transmit the temporary decryption key to any suitable destination. For example, sharing module 1012 may transmit the temporary decryption key to the client system. In this example, a user of the client system who already has access to the encrypted file may then distribute the temporary decryption key for one or more others to use to access the encrypted file (e.g., by emailing the temporary decryption key, posting the temporary decryption key on a website and/or a social networking site, etc.).

Additionally or alternatively, sharing module 1012 may transmit the temporary decryption key to one or more addresses specified in the request to share access. For example, a user of the client system may have specified one or more email addresses to which the temporary decryption key is to be sent. In this example, sharing module 1012 may send one or more emails with the temporary decryption key to the specified email addresses.

Sharing module 1012 may transmit the temporary decryption key in any of a variety of forms. For example, sharing module 1012 may transmit the temporary decryption key within a uniform resource locator. For example, sharing module 1012 may transmit a hyperlink that includes the temporary decryption key and/or information from which the temporary decryption key may be derived. For example, sharing module 1012 may transmit a hyperlink to a third-party storage site. The hyperlink may include an identifier of the encrypted file and the temporary decryption key. For example, the hyperlink may reference "http://www.example.com/ID/temporary-key" where "ID" is the file identifier and "temporary-key" is the temporary decryption key. In these examples, the uniform resource locator may not be stored on non-volatile storage at the third-party storage site and sharing module 1012 may discard it from memory upon processing the request to share access to the encrypted file.

Having generated and transmitted the temporary decryption key, in some examples, one or more of the systems described herein may 1) receive a subsequent request (that includes the temporary decryption key) to access the encrypted file, 2) decrypt the temporary encrypted file key with the temporary decryption key to access the unencrypted version of the file key, and 3) decrypt the encrypted file with the unencrypted version of the file key to provide access to an unencrypted version of the encrypted file. For example, these systems may transmit the unencrypted version of the encrypted file to the requesting client.

In some examples, sharing module 1012 may limit access to the encrypted file via the temporary encrypted file key. In these examples, sharing module 1012 may, at some point, determine that an access limit for sharing the access to the encrypted file has been reached and remove the temporary encrypted file key in response to determining that the access limit has been reached. The access limit may include any of a variety of limits. For example, the access limit may include a limit on a number of times the encrypted file may be accessed via the temporary encrypted file key (and, so, via the temporary decryption key). In this example, sharing module 1012 may track how many times the encrypted file has been accessed via the temporary encrypted file key. For example, sharing module 1012 may limit the number of accesses to 1 time, 5 times, or 800 times. In another example, the access limit may include a time limit. For example, sharing module 1012 may keep the temporary encrypted file key for 10 minutes, 1 hour, 1 day, or 3 months before discarding the temporary encrypted file key. Sharing module 1012 may also limit access to the encrypted file via the temporary encrypted file key according to any of a number of additional criteria. For example, sharing module 1012 may limit the number of Internet Protocol addresses ("IP addresses") from which the encrypted file may be accessed via the temporary encrypted file key (e.g., to one IP address, to 6 IP addresses, to 40 IP addresses).

Figure 13:
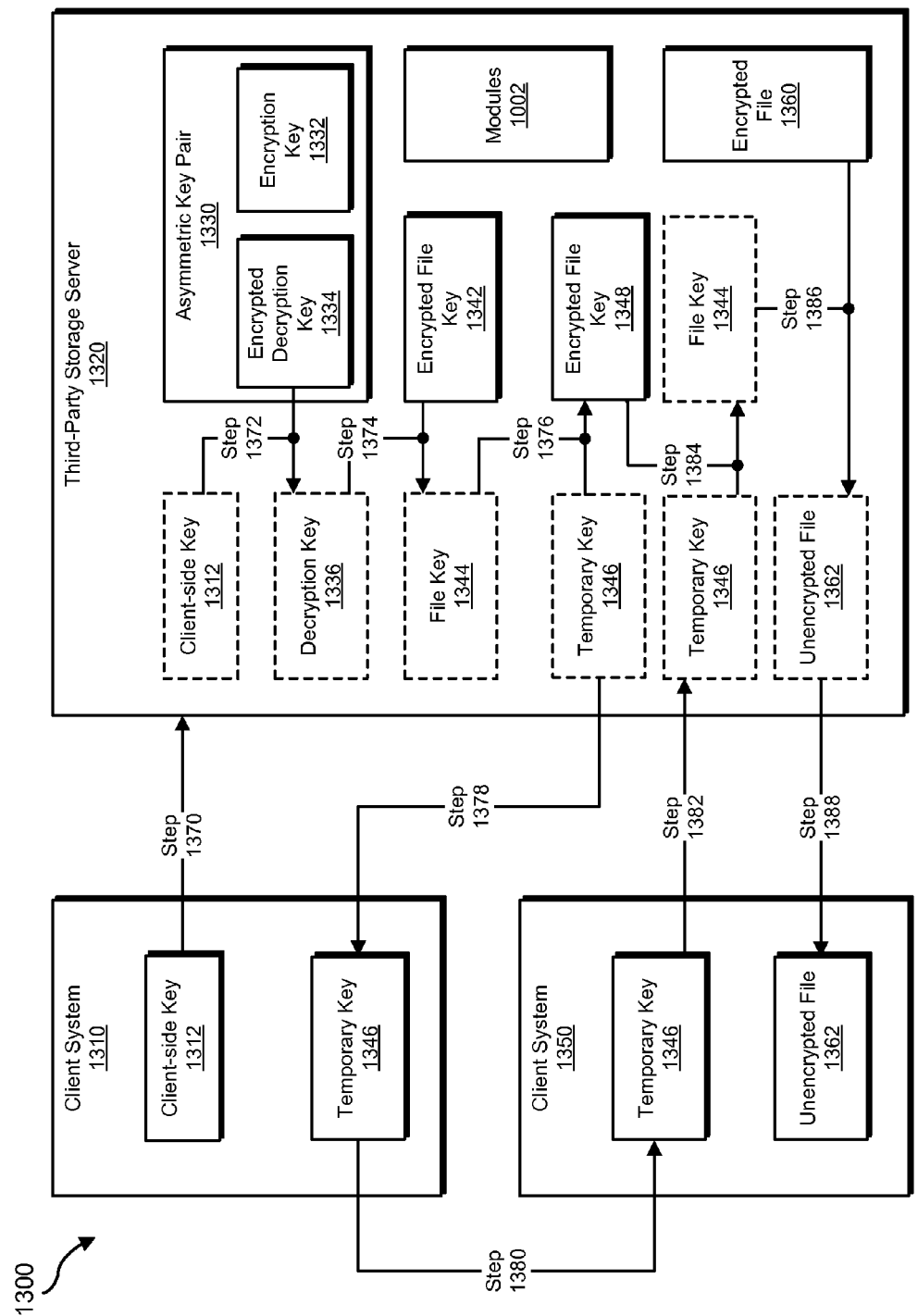
FIG. 13 is a block diagram of an exemplary system for secure third-party data storage.

FIG. 13 illustrates an exemplary system 1300 for secure third-party data storage. As shown in FIG. 13, exemplary system 1300 may include a client system 1310 and a client system 1350 in communication with a third-party storage server 1320. Third-party storage server 1320 may be programmed with one or more of modules 1002. Using FIG. 13 as an example, a user of client system 1310 may have access to the unencrypted contents of an encrypted file 1360 by the use of a client-side key 1312. However, the user of client system 1310 may wish to share the contents of encrypted file 1360 with a user of client system 1350 on a limited and/or temporary basis. At step 1370, client system 1310 may request that third-party storage server create a temporary key 1346 to share that can be used to access the contents of encrypted file 1360 on a limited and/or temporary basis. As part of the request, client system 1310 may transmit client-side key 13112 to third-party storage server 1320.

Third-party storage server 1320 may hold client-side key 1312 in volatile memory without storing client-side key 1312. An asymmetric key pair 1330 may include an encryption key 1332 (previously used to encrypt a file key 1344 used to encrypt encrypted file 1360) and an encrypted decryption key 1334. At step 1372, third-party storage server 1320 may use client-side key 1312 to decrypt encrypted key 1334, producing a decryption key 1336, which third-party storage server 1320 may hold in volatile memory and not store. Third-party storage server 1320 may then discard client-side key 1312 from memory. At step 1374, third-party storage server 1320 may decrypt an encrypted file key 1342 with decryption key 1336 to produce file key 1344, which third-party storage server 1320 may hold in volatile memory and not store. Third-party storage server 1320 may then discard decryption key 1336 from memory.

Third-party storage server 1320 may also generate a temporary key 1346. At step 1376, third-party storage server 1320 may encrypt file key 1344 with temporary key 1346, producing an encrypted file key 1348. At step 1378, third-party storage server 1320 may transmit temporary key 1346 to client system 1310 and discard temporary key 1346 from third-party storage server 1320. At step 1380, the user of client system 1310 may distribute temporary key 1346 to the user of client system 1350 (e.g., by sending an email from client system 1310 that is received at client system 1350). At step 1382, client system 1350 may request access of third-party storage server 1320 to encrypted file 1360 with temporary key 1346. At step 1384, third-party storage server 1320 may decrypt encrypted file key 1348 with temporary key 1346 to produce file key 1344, and discard temporary 1346 from memory. At step 1386, third-party storage server 1302 may decrypt encrypted file 1360 with file key 1344 to produce unencrypted file 1362, and discard file key 1344 from memory. At step 1388, third-party storage server 1320 may transmit unencrypted file 1362 (or a portion of unencrypted file 1362) to client system 1350.

In some examples, third-party storage server 1320 may also discard encrypted file key 1348 after having transmitted unencrypted file 1362 to client system 1350.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for secure third-party storage. As another example, one or more of the modules recited herein may transform an encrypted file into an unencrypted file.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for secure third-party data storage, at least a portion of the method being performed by a computing device comprising at least one processor, the method comprising:
   identifying, at the server-side computing device, a request from a client system to share access to an encrypted file stored under a user account, wherein the access to the encrypted file comprises access to unencrypted contents of the encrypted file;
   identifying, in response to the request, an asymmetric key pair designated for the user account, the asymmetric key pair comprising an encryption key and a decryption key that has been encrypted with a client-side key;
   receiving, from the client system, the client-side key;
   decrypting the decryption key with the client-side key;
   identifying a file key used to encrypt the encrypted file, wherein the file key is encrypted with the encryption key;
   decrypting the file key with the decryption key to create an unencrypted version of the file key;
   generating a temporary encryption key;
   encrypting the unencrypted version of the file key with the temporary encryption key to create a temporary encrypted file key;
   transmitting a temporary decryption key corresponding to the temporary encryption key to share the access to the encrypted file.

2. The computer-implemented method of claim 1, further comprising:
   receiving a subsequent request to access the encrypted file, the subsequent request comprising the temporary decryption key;
   decrypting the temporary encrypted file key with the temporary decryption key to access the unencrypted version of the file key;
   decrypting the encrypted file with the unencrypted version of the file key to provide access to an unencrypted version of the encrypted file.

3. The computer-implemented method of claim 1, wherein sharing access to the encrypted file comprises transmitting the temporary decryption key to the client system.

4. The computer-implemented method of claim 1, wherein sharing access to the encrypted file comprises transmitting the temporary decryption key to at least one address specified in the request to share access.

5. The computer-implemented method of claim 1, wherein transmitting the temporary decryption key comprises transmitting a uniform resource locator that comprises the temporary decryption key.

6. The computer-implemented method of claim 1, further comprising:
   determining that an access limit for sharing the access to the encrypted file has been reached;
   removing the temporary encrypted file key in response to determining that the access limit has been reached.

7. The computer-implemented method of claim 1, wherein generating the temporary encryption key comprises generating the temporary encryption key without storing the temporary encryption key on a non-volatile server-side storage device.

8. A system for secure third-party data storage, the system comprising:
   an identification module programmed to identify, at the server-side computing device, a request from a client system to share access to an encrypted file stored under a user account, wherein the access to the encrypted file comprises access to unencrypted contents of the encrypted file;
   a key module programmed to identify, in response to the request, an asymmetric key pair designated for the user account, the asymmetric key pair comprising an encryption key and a decryption key that has been encrypted with a client-side key;
   a receiving module programmed to receive, from the client system, the client-side key;
   a decryption module programmed to:
      decrypt the decryption key with the client-side key;
      identify a file key used to encrypt the encrypted file, wherein the file key is encrypted with the encryption key;
      decrypt the file key with the decryption key to create an unencrypted version of the file key;
   a sharing module programmed to:
      generate a temporary encryption key;
      encrypt the unencrypted version of the file key with the temporary encryption key to create a temporary encrypted file key;
      transmit a temporary decryption key corresponding to the temporary encryption key to share the access to the encrypted file;
   at least one processor configured to execute the identification module, the key module, the receiving module, the decryption module, and the sharing module.

9. The system of claim 8, wherein:
   the identification module is further programmed to receive a subsequent request to access the encrypted file, the subsequent request comprising the temporary decryption key;
   the decryption module is further programmed to:
      decrypt the temporary encrypted file key with the temporary decryption key to access the unencrypted version of the file key;

decrypt the encrypted file with the unencrypted version of the file key to provide access to an unencrypted version of the encrypted file.

10. The system of claim 8, wherein the sharing module is programmed to share access to the encrypted file by transmitting the temporary decryption key to the client system.

11. The system of claim 8, wherein the sharing module is programmed to share access to the encrypted file by transmitting the temporary decryption key to at least one address specified in the request to share access.

12. The system of claim 8, wherein the sharing module is programmed to transmit the temporary decryption key by transmitting a uniform resource locator that comprises the temporary decryption key.

13. The system of claim 8, wherein the sharing module is further programmed to:
determine that an access limit for sharing the access to the encrypted file has been reached;
remove the temporary encrypted file key in response to determining that the access limit has been reached.

14. The system of claim 8, wherein the sharing module is programmed to generate the temporary encryption key by generating the temporary encryption key without storing the temporary encryption key on a non-volatile server-side storage device.

15. A non-transitory computer-readable-storage medium comprising one or more computer-executable instructions that, when executed by at least one processor of a computing device, cause the computing device to:
identify, at the server-side computing device, a request from a client system to share access to an encrypted file stored under a user account, wherein the access to the encrypted file comprises access to unencrypted contents of the encrypted file;
identify, in response to the request, an asymmetric key pair designated for the user account, the asymmetric key pair comprising an encryption key and a decryption key that has been encrypted with a client-side key;
receive, from the client system, the client-side key;
decrypt the decryption key with the client-side key;
identify a file key used to encrypt the encrypted file, wherein the file key is encrypted with the encryption key;
decrypt the file key with the decryption key to create an unencrypted version of the file key;
generate a temporary encryption key;
encrypt the unencrypted version of the file key with the temporary encryption key to create a temporary encrypted file key;
transmit a temporary decryption key corresponding to the temporary encryption key to share the access to the encrypted file.

16. The non-transitory computer-readable-storage medium of claim 15, wherein the one or more computer-executable instructions further cause the computing device to:
receive a subsequent request to access the encrypted file, the subsequent request comprising the temporary decryption key;
decrypt the temporary encrypted file key with the temporary decryption key to access the unencrypted version of the file key;
decrypt the encrypted file with the unencrypted version of the file key to provide access to an unencrypted version of the encrypted file.

17. The non-transitory computer-readable-storage medium of claim 15, wherein sharing access to the encrypted file comprises transmitting the temporary decryption key to the client system.

18. The non-transitory computer-readable-storage medium of claim 15, wherein sharing access to the encrypted file comprises transmitting the temporary decryption key to at least one address specified in the request to share access.

19. The non-transitory computer-readable-storage medium of claim 15, wherein transmitting the temporary decryption key comprises transmitting a uniform resource locator that comprises the temporary decryption key.

20. The non-transitory computer-readable-storage medium of claim 15, wherein the one or more computer-executable instructions further cause the computing device to:
determine that an access limit for sharing the access to the encrypted file has been reached;
remove the temporary encrypted file key in response to determining that the access limit has been reached.

* * * * *